United States Patent [19]
Woo

[11] 4,003,079
[45] Jan. 11, 1977

[54] CHROMINANCE-LUMINANCE SIGNAL SEPARATION FOR OFF-AIR VIDEO RECORDER

[75] Inventor: Nea-Yea Woo, Rochester, N.Y.

[73] Assignee: Eastman Kodak Company, Rochester, N.Y.

[22] Filed: Aug. 15, 1975

[21] Appl. No.: 605,095

[52] U.S. Cl. .................... 358/31; 358/4; 358/37
[51] Int. Cl.² ........................... H04N 9/535
[58] Field of Search ............ 358/4, 31, 37, 21, 8, 358/36

[56] References Cited
UNITED STATES PATENTS

| | | | |
|---|---|---|---|
| 3,764,739 | 10/1973 | Faroudja | 358/4 |
| 3,798,353 | 3/1974 | Illetschko | 358/37 |
| 3,812,523 | 5/1974 | Narahara | 358/4 |
| 3,872,498 | 3/1975 | Pritchard | 358/4 X |

FOREIGN PATENTS OR APPLICATIONS 2,052,012  4/1972  Germany ..................... 358/31

*Primary Examiner*—Robert L. Richardson
*Assistant Examiner*—Mitchell Saffian
*Attorney, Agent, or Firm*—R. F. Cody

[57] ABSTRACT

An off-the-air color video recorder employs frequency interleaved chroma and luminance signal information for purposes of bandwidth compression. During playback, the interleaved luminance and chroma signal information are combed apart, the luminance signal information, however, being subjected to at least one additional stage of comb filtering, preferably limited to that part of the playback spectrum containing the interleaved signal information. With such a technique, playback luminance signal information is comprised of two spectrum parts, one being, say, half the signal resolution of the other.

2 Claims, 3 Drawing Figures

CHROMINANCE-LUMINANCE SIGNAL SEPARATION FOR OFF-AIR VIDEO RECORDER

CROSS-REFERENCE TO RELATED APPLICATIONS

The following applications are related to each other: application Ser. Nos. 605,100 and 605,101.

BACKGROUND OF THE INVENTION

1. Field of the Invention

This invention relates in general to signal processing and, in particular, to such signal processing as may be employed in connection with an "off-the-air" color video recorder. While not restricted to the recording of signal information on magnetic tape, the invention is cast in such an environment to facilitate its description.

2. Description Relative to the Prior Art

The relatively short history of video recording, whether off-the-air or otherwise, would indicate a trend toward complexity, and away from simplicity. Unlike the audio bandwidth — which may easily be recorded directly, i.e., without a carrier frequency — the video bandwidth presents a severe challenge to a recording system. The video spectrum has a range of about 17 octaves (versus about 10 for sound) and extends to about 4.5 MHz (versus only about 15,000 Hz for sound). Attendantly, the recording of video information has primarily been via modulation techniques, whereby the number of octaves to be recorded can be appreciably reduced. FM recording, in particular, has been the vehicle by which most video recording has been implemented, a typical FM carrier for the baseband video being, say, 12 MHz. Considering that both sidebands are recorded (which is not always the case), this would suggest that the bandpass requirements of such a system would be from 7.5 MHz to 16 MHz, which is only about one octave.

While the octave-reducing quality of FM recording is desirable, it is achieved not without cost, viz., that of system complexity. To replay, say, a 16 MHz signal which is recorded on magnetic tape means that either the head-gap used for playback be extremely small, or that the head-to-tape speed be extremely fast. Typically, with head gaps of 50 microinches, head-to-tape speed has had to be about 1500 inches per second (ips). In light of such high head-to-tape speeds, the art has resorted to the use of so-called rotary systems (transverse; helical), whereby tape transport speed may be kept reasonably slow. Notwithstanding the trend toward modulation of the video signal prior to recording, the head-to-tape speed for a given head gap may be reduced appreciably if the video signal is recorded directly, i.e., without a carrier frequency. Thus, direct recording continues to hold interest for many in the video recording field, provided, of course, that the number of recorded octaves can be reduced sufficiently and without adversely affecting the quality of the images which result from such recording.

As indicated above, the invention is concerned with "off-the-air" recording of video signal information, typically an NTSC (or PAL) signal: The NTSC signal, as is known, contains luminance signal information from DC up to about 4 MHz, and that color signal information (chroma) is interleaved with the luminance signal information at the upper end of the luminance spectrum. Since the acuity of the eye is incapable of resolving, under normal viewing conditions, luminance detail corresponding to luminance signals above about 3 MHz, television manufacturers have, for sake of economy, conventionally band-limited luminance channels to somewhere between 2 to 3 MHz, thereby avoiding the problem of having to comb luminance signal information out of the interleaved chroma/luminance part of the NTSC spectrum. Such a practice poses the suggestion that bandwidth compression for video recording purposes be implemented by interleaving the chroma information with the luminance information below about 3 MHz provided, of course, that the interleaved chroma and luminance information can be combfiltered apart during playback. Given the relatively simple task of interleaving laboratory-produced chroma and luminance, this general approach has already been implemented. See, for example, SID 1975 Digest, pages 14 and 15, which teaches that the spread of the chroma and luminance sidebands around multiples of the video scanning frequency may be reduced, by combfiltering both chroma and luminance prior to signal interleaving, to avoid interaction between the luminance and chroma information. Such a practice may be likened to "sharpening the teeth of two overlaid combs, the respective teeth of which are almost aligned".

Off-the-air recording, on the other hand, is by no means a laboratory setup, since there is no control over the source of the video signal: The NTSC signal is customized, standardized, and designed not for a video recorder, but rather for reception and processing by a television receiver.

FIG. 1, which is described in detail below, discloses an off-the-air video tape recording system of the direct recording type in which the NTSC signal is detected; the chroma informaton (0.5 MHz bandwidth) removed from the detected signal; and then down-converted from its conventional subcarrier frequency (3.58 MHz) so as to interleave with luminance information bandlimited to about 2.5 MHz. During playback, the chroma and luminance information are combed apart; the chroma up-converted to 3.58 MHz; and the 0 to 2.5 MHz luminance information, and up-converted chroma centered at 3.58 MHz ($\pm$ 0.5 MHz), which together comprise a modified NTSC signal, placed on a carrier for replay through a vacant channel of a television receiver.

Visual examination of the television picture, produced using the setup of FIG. 1, indicated a fairly acceptable picture, but for certain liveliness (not Moire) appearing within the picture: The source of such lively artifacts thus had to be identified so that appropriate measures could be taken to remove the problem source. Otherwise, off-the-air recording of interleaved luminance/chroma, derived from an NTSC signal, would not be practical in a commercial sense. At first blush, it had appeared that any one, or combination, of the components of FIG. 1 could be the source of the above-identified artifacts: The antenna system could have been bad, the tape could have been noisy; or any modulator, or oscillator, or amplifier, etc., could have been working improperly, e.g., non-linearly.

Rather than one of the more obvious sources of the picture liveliness problem, it was found — as disclosed in copending U.S. application Ser. No. No. 605,101 — that a fundamental characteristic of the NTSC signal had to be taken into consideration if the direct recording of interleaved chroma and luminance signal information were to be effective, viz., while it is true that the power contained in luminance information at around 3.58 MHz is quite low, it is nevertheless not nonexistent. Any attempt to down-convert chroma at 3.58 MHz, as indicated in connection with FIG. 1, resulted in the simultaneous down-conversion of low power luminance signal information — and it was the down-converted luminance signal information which, when it beat against the lower frequency luminance components, caused the picture liveliness which was noted. Accordingly, as indicated in copending application Ser. No. 605,101, the off-the-air received NTSC-type signal was pre-combed of residual high frequency luminance information prior to its being downconverted, thereby avoiding the above-noted beating of high and low frequency luminance components; and resulting, during playback, in a television picture in which picture liveliness was minimized.

While picture liveliness was minimized by the teaching of application Ser. No. 605,101, the television picture, however, still left something to be desired. Along horizontal edges within the television picture, a moving picture defect, somewhat akin to what one might experience while looking at a "shooting gallery", was noted. By analysis, as indicated in copending application Ser. No. 605,100, it was determined that the source of the shooting gallery effect was the bleeding — at the point within the FIG. 1 apparatus where the interleaved chroma and luminance are combed apart during playback — of chroma information into the luminance channel; and such bleeding resulted from vertical variations in the hue of the recorded scene. To reduce the effect of scene vertical hue variations, copending application Ser. No. 605,100 teaches, in a recording system of the type described, the line averaging of color information, prior to recording such information, as a vehicle for reducing the amplitude and visual effect of the color information which bleeds into the playback luminance channel.

Despite the measures of copending application Ser. Nos. 605,101 and 605,100 to improve picture quality, however, some liveliness in the playback picture still remained.

SUMMARY OF THE INVENTION

Theorizing that the remaining picture liveliness resulted from the overlap of played-back interleaved chroma and luminance sidebands — causing the combing apart of the played-back chroma and luminance signal information to be less than totally effective — the invention proposes that the played-back luminance, which is combed apart from chroma with which it interleaves, be subjected to subsequent combing by at least one comb filtering stage. Such subsequent combing may be limited to luminance signal processing on the theory that the overlap of luminance sidebands on chroma sidebands is not as productive of visual effects as is the overlap of chroma sidebands on luminance sidebands.

Since, as is known, a comb filter has the effect of halving the vertical resolution of information which it processes, and since picture resolution is virtually synonymous with luminance detail, the invention in its presently preferred form, while proposing the use of successive comb filters for playback luminance, provides that the playback comb filtering of luminance be limited to that part of the playback spectrum which contains interleaved chroma and luminance.

The invention will be further described with reference to the figures, wherein.

Figure 1:
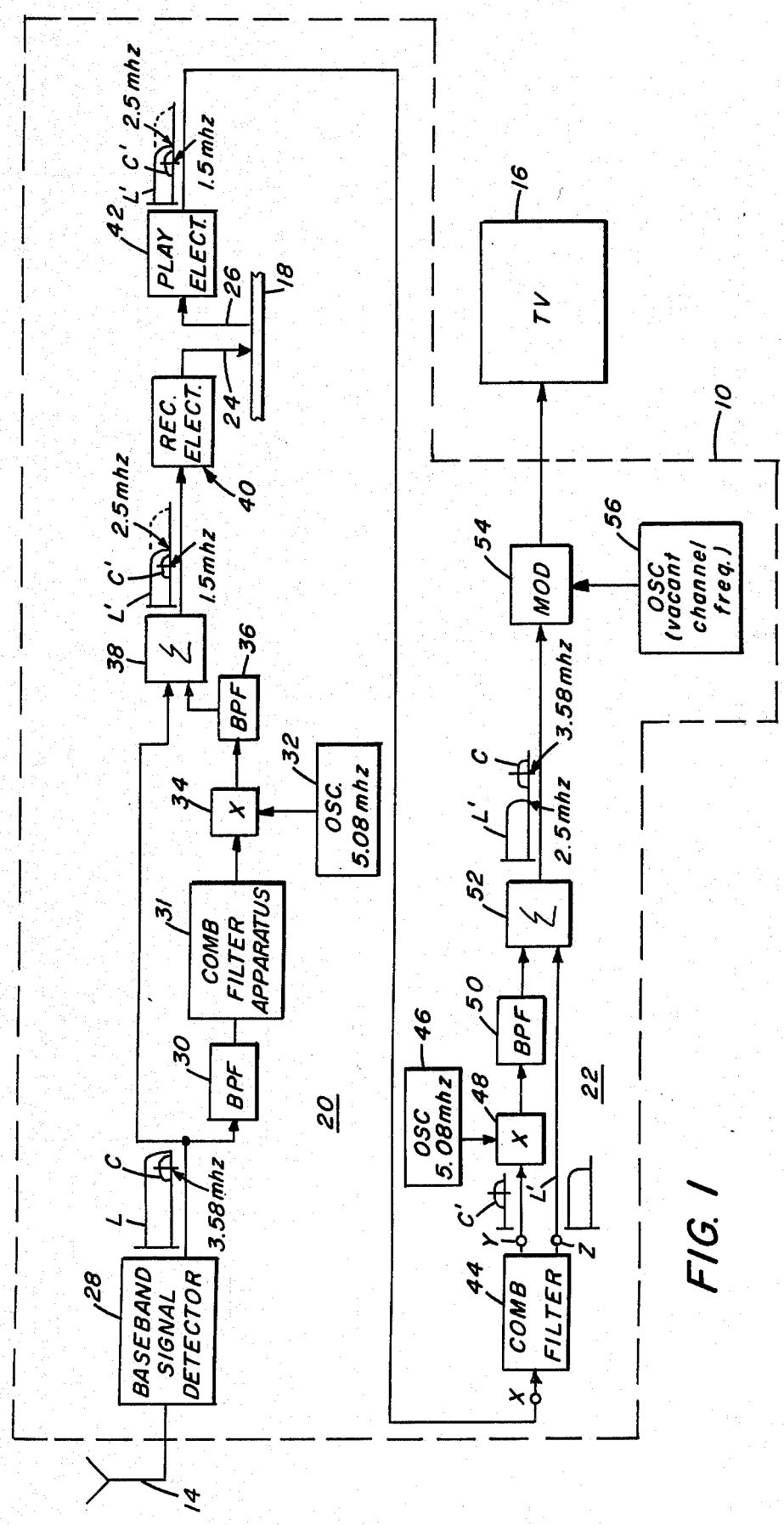
FIG. 1 is a block diagram including an off-the-air video recorder employing interleaved luminance and chroma signal information for band compression purposes.

Referring to FIG. 1, apparatus such as that described in copending application Ser. No. 605,101 embodies a video tape recorder 10 (VTR) that is adapted to be connected to a television antenna 14 and to the input terminals of a television receiver 16 which, in this case, is a color set. While not so indicated, the VTR would conventionally be provided with switching so that record-while-viewing (either the same or different television channels) or play-only modes could be practiced by the VTR user. Magnetic tape 18, constituting the recording medium, conventionally separates the RECORD side 20 of the VTR from the recorder PLAY side 22 and, whether the same magnetic head, or heads, is, or are, used for record and playback is of no consequence as far as the invention is concerned. Accordingly, two closely-spaced arrows 24, 26 are indicated to symbolize the flow of signal information to and from the tape 18 during, respectively, recording and playback.

The RECORD side 20 of the VTR includes a circuit 28 for detecting the baseband NTSC signal of a selected television channel. As such, the circuit 28 includes a channel selector (tuner) and respective circuits for separating the video and audio parts of the NTSC signal. Since audio signal processing is an aside as far as the invention is concerned, no further reference to audio signal processing is made herein.

Before proceeding further, however, it is to be realized that the invention is practiceable with any NTSC-type signal, not merely with the standard NTSC signal employed in the United States. Thus, any baseband television signal employing a chroma carrier that is an odd multiple of half the line scan rate may be processed while practicing the invention. For ease of description, it will be assumed that the detected baseband signal is the standard NTSC signal:

The output video signal of the baseband signal detector 28, which signal may, for example, correspond to detection of any of the VHF or UHF television channels, is comprised of a luminance signal portion L and a chroma signal portion C, the chroma signal portion being on a subcarrier of 3.58 MHz that is so selected that the chroma sidebands interleave with the portion of the luminance spectrum in which the luminance power is relatively slight. The chroma signal information, at a center frequency of 3.58 MHz, is culled from the baseband signal by use of a highpass filter 30; combed — and line-averaged per application Ser. No. 605,100 — by a filter apparatus 31, to remove high frequency luminance interleaved with the chroma signal information, and then down-converted so as to have frequencies centered at 1.5 MHz ($\pm$ 0.5 MHz), the down-conversion being by use of 5.08 MHz oscillator 32 whose output is mixed (34) with the 3.58 MHz color subcarrier to produce a difference frequency centered at 1.5 MHz (±0.5 MHz). The down-converted chroma signal information is then bandpassed (36) for recombining (summer 38) with the luminance signal L. Because the sidebands of the 3.58 MHz chroma subcarrier interleave with the luminance signal components, so too do the sidebands of the down-converted chroma subcarrier.

The output of the summer 38 is applied via record electronics 40 and signal path 24 to, and directly recorded on, magnetic tape 18, which may be transported past record/play heads in any known way. The record electronics 40 may provide, for example, high frequency pre-emphasis, and high frequency bias for linearizing the direct recording.

As indicated at the output of the summer 38, down-converted chroma (C') is interleaved with the midpart of the luminance spectrum (L'), the point here being that from about 3 MHz and above, either or both the RECORD side 20 and the PLAY side 22 (see the above reference to television receiver manufacturers) is bandedge limited. Such "low passing" of the luminance information L' can either be by use of filters, or by design of any of several components in the record-play signal channel. (The dotted portion of the spectrum appearing at the output of the summer 38 represents information which is effectively filtered out by the record/play signal processing; and the indicated 2.5 MHz bandedge for luminance L' is a presently preferred upper frequency which permits a head-to-tape writing speed of 90 ips).

During playback, the recorded signal information is processed by playback electronics 42, which may include signal equalizing and de-emphasizing circuits; and then applied to a comb filter 44 incorporating the invention.

Figure 2:
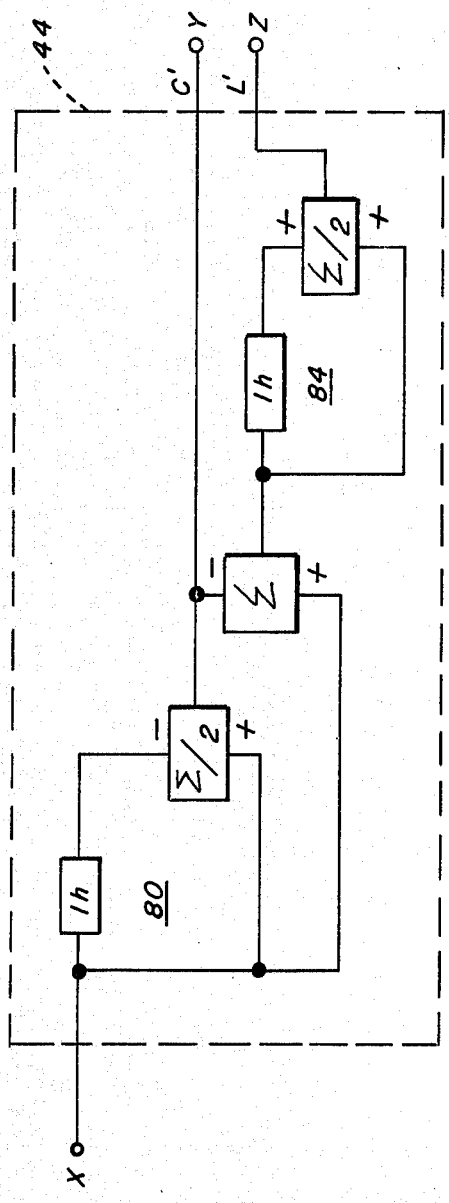
FIG. 2 is a block diagram of comb filter apparatus adapted for inclusion in the recorder of FIG. 1 for practicing one aspect of the invention.

With reference to FIG. 2, the circuit 44, which is connected between points X, Y, Z of the VTR 10, includes a circuit 80 which combs chroma C' out of the playback signal appearing at point X, in the manner indicated in FIG. 2 of copending application Ser. No. 605,101. The output of the circuit 80, which may include a marginal amount of (unnoticeable) luminance information, is — aside from being applied to the point Y — applied to a difference circuit 82 within which it is subtracted from the playback signal appearing at point X, thereby to "derive" a luminance signal L. The derived luminance signal L, in accordance with the invention, is applied to a comb filter 84 for removal of chroma sidebands that overlap luminance sidebands; the "clean" luminance signal sidebands being applied to point Z of the VTR 10.

Figure 3:
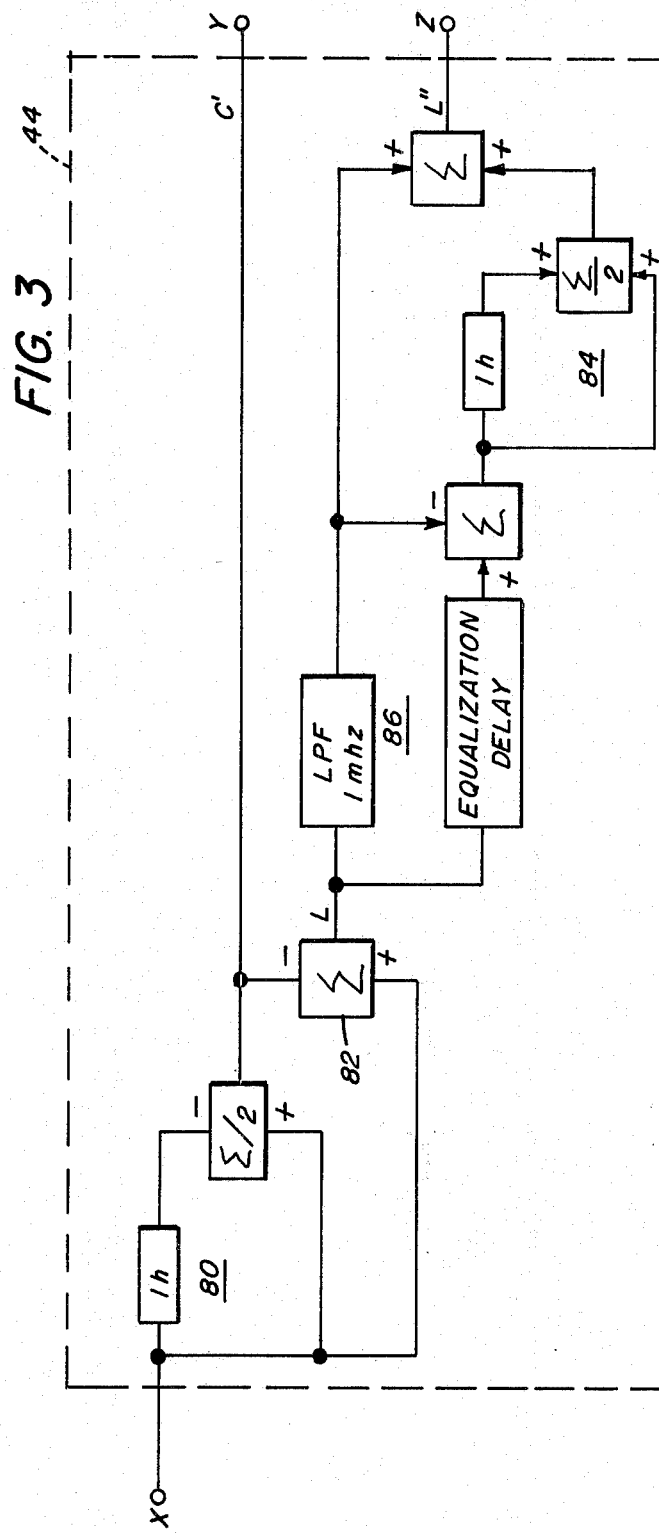
FIG. 3 is a block diagram of comb filter apparatus adapted for inclusion in the recorder of FIG. 1 and incorporating the invention in its presently preferred form.

Since, as indicated earlier, a comb filter halves the vertical resolution of signals which it processes, the invention proposes that the playback comb filtering of luminance be limited to that part of the playback spectrum containing interleaved chroma and luminance. Thus, as indicated in FIG. 3, the luminance spectrum is divided into two parts (one containing interleaved chroma and one devoid of chroma) by a circuit 86. The spectrum part containing interleaved chroma is the spectrum part which is applied to the comb filter 84, the output of which is recombined with that part of the luminance spectrum (below 1 MHz) which does not interleave with chroma. This results in a luminance signal output L" which, it is interesting to not, contains full resolution up to 1 MHz of the luminance detail of each line of video information; while providing half-resolution of the luminance detail above 1 MHz.

The two outputs, C' and L', or C' and L", as the case may be, are then processed as follows: The chroma output C' is up-converted by means of a 5.08 MHz oscillator 46 and mixer 48. The up-converted chroma difference frequencies (3.58 ± 0.5 MHz) are bandpassed (50) and then recombined (summer 52) with the combed-out luminance L', or L", as the case may be, to produce a modified NTSC baseband signal, i.e., a signal in which the chroma and luminance sidebands no longer partly interleave, owing to the bandlimiting which stripped the high frequency luminance in the region of 3.58 MHz. Such modified NTSC signal is then employed to modulate (54) a carrier (oscillator 56) corresponding to a vacant channel of the television receiver 16.

With the output of the modulator 54 applied to the input terminals of the television receiver 16, and with the television receiver turned on, and its channel selector set to the above-noted vacant channel, visual information corrsponding to the modulator output appears on the face of the television receiver 16.

The invention has been described in detail with particular reference to preferred embodiments thereof, but it will be understood that variations and modifications can be effected within the spirit and scope of the invention: Though not shown, it is obvious that equalizing delays will be included in the circuits which have been described to maintain proper phase coherence between luminance and chroma, and between high and low frequency luminance, in both record and playback circuits.

What is claimed is:

1. Apparatus for processing interleaved chroma and luminance signals produced by line scanning a scene, the chroma being on a carrier that is an odd multiple of half the line scan rate, comprising:
    a. means for producing a signal delay that corresponds with a multiple of the duration of a scan line;
    b. first means for algebraically differencing a pair of signals;
    c. means for applying the interleaved signals to said signal delay means and to said means for algebraically differencing signals, the output of said delay means being applied to said means for algebraically differencing signals, the output of said first algebraic differencing means being said chroma signal;
    d. second means for algebraically differencing signals, adapted to receive said interleaved signals and said chroma signal, the output of said second algebraic differencing means being said luminance signal; and
    e. comb filter means adapted to receive and process said luminance signal.

2. The apparatus of claim 1 wherein said comb filter means includes a bandpass filter for limiting the comb filtering of said comb filter to a particular band of frequencies for said luminance signal.

* * * * *